United States Patent
Ebadollahi et al.

(10) Patent No.: US 6,514,207 B2
(45) Date of Patent: Feb. 4, 2003

(54) METHOD AND APPARATUS FOR PROCESSING ECHOCARDIOGRAM VIDEO IMAGES

(75) Inventors: Shahram Ebadollahi, Tarrytown, NY (US); Shih-Fu Chang, New York, NY (US); Henry Wu, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 28 days.

(21) Appl. No.: 09/835,166

(22) Filed: Apr. 16, 2001

(65) Prior Publication Data

US 2002/0007117 A1 Jan. 17, 2002

Related U.S. Application Data

(60) Provisional application No. 60/196,951, filed on Apr. 13, 2000.

(51) Int. Cl.$^7$ .................................................. A61B 8/06
(52) U.S. Cl. ...................................................... 600/450
(58) Field of Search ................................ 600/437, 407, 600/440–447, 449–459; 73/625, 626, 641; 367/7, 11, 138; 128/916; 424/9.52; 382/294; 348/441, 443, 384.1

(56) References Cited

U.S. PATENT DOCUMENTS

| | | | | |
|---|---|---|---|---|
| 5,385,725 A | * | 1/1995 | Lin et al. | 424/9.52 |
| 5,419,328 A | * | 5/1995 | Goh et al. | 600/443 |
| 5,570,430 A | * | 10/1996 | Sheehan et al. | 378/98.5 |
| 5,797,396 A | * | 8/1998 | Geiser et al. | 382/128 |
| 5,873,830 A | * | 2/1999 | Hossack et al. | 600/447 |
| 5,910,111 A | * | 6/1999 | Hunziker | 359/23 |

OTHER PUBLICATIONS

Yihong Gong et al., "Automatic Parsing of TV Soccer Programs," Proceedings of the International Conference on Multimedia Computing and Systems, 1995, pp. 167–174.

Wayne Wolf, "Key Frame Selection by Motion Analysis," Proceedings of ICASSP '96, 1996, pp. 1228–1231.

John S. Boreczky et al., "Comparison of Video Shot Boundary Detection Techniques," Storage and Retrieval for Image and Video Databases IV, Proceedings of IS&T/SPIE 1996 International Symposium on Electrical Imaging: Science and Technology, Feb. 1996, San Jose, CA.

Michael G. Christel et al., "Multimedia Abstractions for a Digital Video Library," Proceedings of the 2nd ACM International Conference on Digital Libraries, Jul. 1997, pp. 21–29.

Anita Komlodi et al., "Key Frame Preview Techniques for Video Browsing," Proceedings of ACM International Conference on Digital Libraries, 1998, pp. 118–125, Pittsburgh, PA.

* cited by examiner

*Primary Examiner*—George Manuel
*Assistant Examiner*—Ali M. Imam
(74) *Attorney, Agent, or Firm*—Baker Botts L.L.P.

(57) ABSTRACT

Methods and a system are disclosed for processing an echocardiogram video of a patient's heart. The echocardiogram comprises at least a first sequence of consecutive video frames corresponding to a first view of the patient's heart concatenated with a second sequence of consecutive video frames corresponding to a second view of the patient's heart. The end-diastole phase of the patient's heart is monitored in each frame by detecting the electrocardiograph wave, and a key frame is selected upon the occurrence of the R-wave peak in the electrocardiograph wave in each of the first sequence of consecutive video frames and in the second sequence of consecutive video frames. The shape and color content of the echocardiogram image window is monitored in certain video frames, and a transition is detected when there is a change in the first feature between adjacent frames. A summary is generated which comprises by the video frames corresponding to the end-diastole phase.

32 Claims, 11 Drawing Sheets

FIG. 2(a)

| 600 VIEW / CARDIAC OBJECT | AORTA | 602a AORTIC VALVE | 602b PULMONARY VALVE | 602c TRICUSPID VALVE | 602d MITRAL VALVE | 602e LEFT VENTRICLE | 602f RIGHT VENTRICLE | 602g |
|---|---|---|---|---|---|---|---|---|
| 604a PARASTERNAL LONG AXIS | ✓ 606a | ✓ | | | ✓ | ✓ | | |
| 604b PARASTERNAL LONG AXIS-RIGHT VENTRICULAR INFLUX TRACT | | | | | | | ✓ | |
| 604c PARASTERNAL LONG AXIS-PULMONIC | | | ✓ | | | | | |
| 604d PARASTERNAL LONG AXIS-BASE LEVEL | ✓ 606b | ✓ | ✓ | ✓ | | | | |
| 604e PARASTERNAL LONG AXIS-MITRAL VALVE | | | | | ✓ | ✓ | | |
| 604f PARASTERNAL LONG AXIS-PAPILLARY MUSCLE | | | | | | ✓ | | |
| 604g PARASTERNAL LONG AXIS-APEX LEVEL | | | | | | ✓ | | |
| 604h APICAL 4 CHAMBER | | | | ✓ | ✓ | ✓ | ✓ | |
| 604i APICAL 5 CHAMBER | | ✓ | | ✓ | ✓ | ✓ | ✓ | |
| 604j APICAL 2 CHAMBER | | | | | ✓ | ✓ | | |
| 604k APICAL 3 CHAMBER | | ✓ | | | ✓ | ✓ | | |
| 604l SUBCOASTAL 4 CHAMBER | ✓ 606c | | | | | ✓ | ✓ | |
| 604m SUBCOASTAL INFERIOR VENA CAVA | | | | | | | | |

500

PATIENT ID: 000-00-000 ⟵ 501

FINDINGS

502 — AORTIC VALVE AND LY OUTFLOW TRACT: CUSPS ARE MILDLY THICKENED. NO REGURGITATION IS PRESENT BY COLOR FLOW MAPPING.

504 — AORTA - THE ASCENDING AORTA APPEARS NORMAL

506 — MITRAL VALVE - CUSPS ARE MILDLY THICKENED.

508 — LEFT ATRIUM - THE LEFT ATRIUM APPEARS MILDLY DILATED

*FIG. 11*

METHOD AND APPARATUS FOR PROCESSING ECHOCARDIOGRAM VIDEO IMAGES

CROSS-REFERENCE TO RELATED APPLICATION

This application claims priority to U.S. Provisional Patent Application entitled "Method and Apparatus for Indexing and Summarizing Echocardiogram Video Images," Serial No. 60/196,951, which was filed on Apr. 13, 2000.

BACKGROUND OF THE INVENTION

1. Field of the Invention

This invention relates to video indexing and summarization, and more particularly, to methods and systems for indexing and summarizing echocardiogram images.

2. Background of the Related Art

An echocardiogram is a common and useful ultrasound imaging technique used for viewing a patient's cardiac function. To administer an echocardiogram, a technician holds a transducer on the patient's chest above the body organs that the physician, e.g., the cardiologist, wants to visualize. The transducer generates high frequency sound waves, which are reflected back to the transducer by the different structures of the heart. This reflection of the waves or "echoes" is used to form an image by the machine.

The echocardiogram is useful to measure the size of the heart structures and the thickness of the heart muscle. It can be used to observe how the heart is working, e.g., to observe blood flow through the heart chambers (when combined with a Doppler technique), or how the heart wall is moving (when combined with stress test). The echocardiogram can identify tumors or emboli in the heart. In addition, it can detect structural abnormalities of the heart wall, the valves, and the blood vessels transporting blood to and from the heart. This technique is useful for diagnosing congenital heart disease (i.e., ventricular septal defect), cardiomyopathies, and aneurysms.

Echocardiogram videos (hereinafter "echo videos") are typically captured and stored on analog videotapes, and a particular echo study may have a duration of several minutes. Although an echocardiogram is capable of providing a significant amount of information to the physician, it consequently may be a challenge for the physician to examine this amount of information and provide a diagnosis for large number of patients. The cardiology department of a typical hospital has an archive of thousands of echocardiograms captured each year. To derive useful information from this analog archive, the physician or other specialist must watch each echo study using a video cassette player (VCR) with such limited functionalities as rewind and fast forward. In order to find a particular view corresponding to a certain probe location, the physician must search through the entire videotape record of a patient's study manually, by using the rewind and fast forwards controls. This process introduces a number of inefficiencies, including the excessive amount of time spent by the physician to review irrelevant video information, and the resources of the hospital or medical facility that must be used to archive a large number of videotapes.

Typical techniques for improving the process have largely been directed towards more efficient storage of the videotape record. For example, the analog videotape may be digitized and stored on a hard drive rather than on analog video tapes. In addition, various compression techniques such as MPEG-1, MPEG-2, or full motion JPEG for video have been used to store the video sequences. However, none of these techniques significantly relieves the user of the need to view the entire videotape record to perform a diagnosis.

SUMMARY OF THE INVENTION

The invention provides a method and a system for indexing and summarizing the echo videos, which provide the user with the necessary tools for efficient access and browsing. In accordance with the invention, the user is able to view a summary of the echo study of a patient in the form of a table of representative frames, instead of the full length of the video. The physician may make a diagnosis based on these representative frames, or alternatively, the representative frames provide a link for the user to view the full length video that may show any abnormality or a specific structure of interest.

A method for processing an echocardiogram video of a patient's heart is disclosed. The echocardiogram video comprises a first sequence of consecutive video frames corresponding to a first view of the patient's heart concatenated with a second sequence of consecutive video frames corresponding to a second view of the patient's heart. The method comprises receiving the first sequence of consecutive video frames and the second sequence of consecutive video frames. A first feature is observed in each video frame. A transition is detected between the first sequence of consecutive video frames and the second sequence of consecutive video frames by observing a discontinuity in the first feature between adjacent video frames. The method further comprises observing a second feature in the first sequence of consecutive video frames and the second sequence of consecutive video frames. A video frame in each of the first plurality of video frames and the second plurality of video frames is selected, corresponding to an occurrence of the second feature in each of the first sequence of consecutive video frames and the second sequence of consecutive video frames. The method further comprises generating a summary comprising video frames corresponding to the occurrences of the second feature.

Accordingly, it is an object of the invention to provide a method and system that makes more efficient use of the user's time in providing a diagnosis by presenting only relevant representative frames to the user.

It is another object of the invention to provide the capability of making a diagnosis from a remote location by reducing the amount of video that must be transferred from the location where the echocardiograms are acquired and the location of the specialist.

It is a further object of the invention to provide the capability to compare a patient's current study with the patient's previous studies on record, or to compare the patient's study with a "normal" echocardiogram by reviewing the summaries of echocardiogram videos rather than the entire video.

BRIEF DESCRIPTION OF THE DRAWINGS

FIG. 2(a) is a simplified exemplary table which correlates various objects of the heart and the echocardiogram views in which they are visible.

FIG. 11 is an exemplary findings report containing the objects and diagnosis information, in accordance with the invention.

DETAILED DESCRIPTION OF THE EMBODIMENTS

Figure 1:
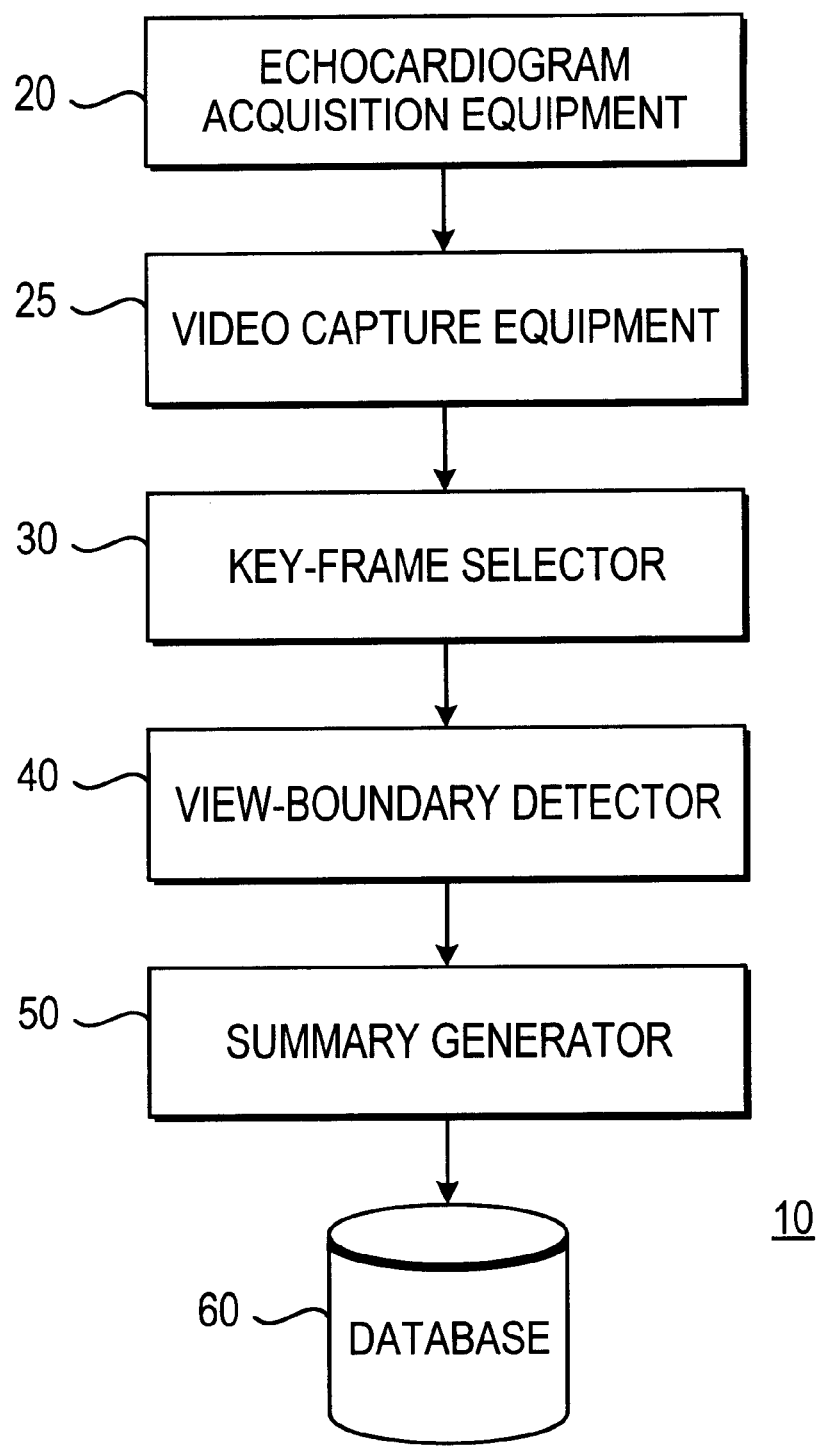
FIG. 1 is a block diagram of an exemplary system in accordance with the invention.

Referring to the drawings, and in particular to FIG. 1, a preferred embodiment of a system, for processing echocardiograms in accordance with the invention is depicted and generally referred to as system 10. The echocardiogram images are acquired by well-known echocardiogram acquisition equipment 20, as described above. The resulting echocardiogram images are typically in analog videotape form. Video capture and storage equipment 25 may include a video capture card to digitize the analog video and video storage, such as a hard drive, to store the resulting digital video frames. Alternatively, the echocardiogram images may be directly captured in digital format, thereby eliminating the need for an intermediate digitizing step.

In order to analyze the video, algorithms have been developed which rely on domain knowledge. Domain knowledge is information related to the particular content of the video for which the indexing and summarizing algorithms have been formulated. According to the invention, the novel algorithms have been created to refer to the unique properties of the echocardiogram images. For example, the heart functioning is periodic in nature, and the domain knowledge will reflect this basic characteristic, as will be described in greater detail below. Domain knowledge will also provide information on the structure and functioning of the typical human heart or other body structures, information related to the patient, and information relevant to the types of views that are used in the echocardiogram. For example, domain knowledge will provide information on the configuration, size, and interaction of the various chambers of the heart. It may also include information about the different probe locations used and the various views that are taken during a typical echo study. Domain knowledge provides useful information which provides the framework from which the video processing may be performed.

Following video acquisition and digitization, the resulting video is a collection of several different views taken from several probe locations, but having no marked separation points between the different views. The video frames are stored on computer memory, such as a computer hard drive. The view key frame selector 30, the view-boundary detector 40, and summary generator 50 perform a series of data processing operations by a computer, executing programs stored in a program memory, such as in RAM.

The echo video comprises a plurality of sequences of consecutive video frames. Each sequence may be referred to as a "view," corresponding to a particular probe location, zoom setting, and/or color content. Due to the periodic nature of each view, certain stages in the heart cycle may be of particular interest. The key frame selector 30 identifies "key frames," or representative frames, for each view. Domain knowledge is useful here in order to select which particular frame in a view best illustrates the condition of the patient's heart for diagnosis. For example, it is considered desirable to view the patient's heart in its most expanded state, i.e., the "end-diastole" of the heart cycle. As will be described in greater detail herein, the key frame selector 30 will therefore identify frames corresponding to the end-diastole stage in the heart cycle. The output of the key frame selection is a plurality of key frames.

The view-boundary detector 40 identifies the transitions between views on the echo video. As will be described in greater detail below, the view-boundary detector 40 observes a feature in each view. Domain knowledge, such as representative shapes of the echo window and representative color information in a frame are examples of features observed in each frame. Observation of variations in the shape of the echo-window, and the color content, between adjacent video frames is used to detect the location of transitions. The output of the view-boundary detector may be identifiers of the transition locations between views.

Once the views boundaries have be located and the key frames for each of the views on the video have been selected, they are collected together to provide a summary by the summary generator 50. Since the key frames are selected to provide representative visual information for all of the frames in each view, it allows the specialist to begin the make a diagnosis without viewing the entire video record. As will be described in greater detail herein, the summary may be a "static" summary, which is a collection of individual key frames. Alternatively, the summary may be a "dynamic" summary, which is a collection of short video sequences or subsets of each view, in which each subset includes video frames for one heart cycle between and including two consecutive key frames.

The physician is provided with the summaries produced by the summary generator 50, in order to make a diagnosis. Since the physician has been provided with the most relevant information by the system and methods in accordance with the invention, the physician may be able to complete a diagnosis without reviewing the entire video record. The physician may review the summaries from either the location in which the echo study was performed, or from a remote location by transmitting this information to the physician's location, which requires a minimum amount of bandwidth, when compared with transmitting the entire video record. After reviewing the summaries, the physician's diagnosis may make reference to the condition of various structures of the heart. The text of the physician's diagnosis is provided back to the processor for storage by a database 60.

Domain knowledge influenced the development of the algorithms according to the invention. Two important components of the domain knowledge are (1) the structure and appearance of the echo video, and (2) the periodic nature of the heart functioning. The characteristics of the echo video are significantly different from those associated with general context video, such as news, movies, and sports. As a result, known algorithms which have previously been developed for video recognition of general context video may not be useful when used with echo video.

An echo video is a concatenation of several black-and-white and/or colored views. As described above, each view is a sequence of consecutive video frames taken from a particular location, angle and zoom setting of the ultrasound imaging device. There are standard, predetermined locations at which a technician will place the probe during the echocardiogram acquisition. Thus, each view may be one of the several possible standard views, which are known from the available domain knowledge.

One view is the standard Two-dimensional (2D) black-and-white view at a particular probe location and zoom setting. Each frame of these standard 2D black-and-white views has a triangular window in which the echo image appears, as well as some text and measurement guides. The echo image, or sector scan, henceforth referred to as the Region of Interest ("ROI") is the region where the result of the ultrasound imaging and the color content of each frame of the video appears. As will be described in greater detail herein, the view-boundary detection and view recognition procedures may rely on the shape of the ROI as a "signature" recognition feature.

The black-and-white standard views may be followed by a zoom view of a certain area of the heart viewed by the standard view. The image in a zoom view appears in a substantially square or a trapezoidal ROI shape, which can be used as a signature of these types of views for view-boundary detection and view recognition purposes.

Doppler measurement views, or M-mode views, are another type of black-and-white view. Doppler techniques are used to record the manner in which blood moves within the cardiovascular system, and are an integral part of almost every ultrasonic examination of the heart. Echo images taken by Doppler techniques appear in a rectangular window, which has a distinctive size and shape known in the art which is different from that of the substantially square zoom windows.

The color views may have the same probe locations as their black-and-white counterparts, with color information superimposed on top. Therefore, there is a corresponding black-and-white view for each color view. The color shots are two-dimensional Doppler flows, which are superimposed on the two-dimensional cardiac image. The color content of the views is a recognition feature of the algorithms described herein. The common method for indicating the direction of blood flow in these views is to encode flow moving towards the transducer in a first color, and blood flow going away from the transducer in a second color.

In a typical echo video, the last video frame of one view, i.e., a first sequence of consecutive video frames, will be followed by the first video frame of the next view, i.e., a second sequence of consecutive video frames, without any editing effects, transitions, or indications. Alternatively, there may be a sequence of blank frames between two consecutive frames.

The domain knowledge will also include information on the physiology of the heart. For example, each view in the echo video has a repetitive structure over time. This is due to the cyclic, pumping motion of the heart. Therefore, in most the cases, it may be necessary to view only one complete cycle of the heart to get sufficient information about a particular view. In order to improve the reliability of the view boundary and view recognition procedures, it may also be desirable to view several cycles of the heart motion, and take an average of corresponding frames in several cycles. In each cardiac cycle, the heart goes through two phases. During the first phase, the heart is expanding (diastole), and in the other phase, the heart is contracting (systole). A video frame taken from the end of the expansion phase, i.e., the end-diastole frame, is particularly useful because the heart in this state is most expanded and all the cardiac objects are viewable. Alternatively, a short sequence of video frames taken from one end-diastole to the next end-diastole may be particularly useful to diagnosis heart function.

The end-diastole phase of the heart cycle may be detected in electrocardiograph ("ECG") information. The electrocardiogram recorded by the ECG consists of wave functions, e.g. the P and QRS, and T waves, corresponding to electrical activation of various structures of the heart. The shape of the QRS complex reflects the convoluted manner that a depolarization wave spreads over the ventricles. In particular, the R-wave represents the first upward deflection of the QRS complex, and occurs during the activation of a bulk of the muscles of both ventricles. The end-diastole phase occurs right after the peak in the R-wave.

From the domain knowledge available from the specialists, a table of correspondences has been prepared which takes into account the objects of the heart which are normally considered in the diagnosis and the particular views in an echo study. An exemplary table of correspondence 600 is illustrated in FIG. 2(a). The table of correspondence 600 provides information on which objects of the heart are typically visible in each of the standard views, as described above. For example, the various objects of the heart are represented in the columns 602a–602f. The various standard views are represented in the rows 604a–604m. Those views in which the objects of the heart are visible are indicated in the table as data points. In this example, data points 606a–606c indicate those views which display the aorta 602a. Therefore, the aorta is visible in the Parasternal Long Axis View 604a, the Parasternal Short Axis View 604b, and the Apical 3 Chamber View 604k.

Each of the digitized sequences of consecutive frames in the echo video are passed from video storage and received by the key frame selector 30, which uses a key-frame selection algorithm, described in greater detail herein, to monitor a particular feature in each video frame, and to select a key frame corresponding to an occurrence of the feature in a video frame. The key frame selection process can be regarded as sampling the content of the video. The selection of the key frame according to the invention is significantly different from the key frame selection in a general context video. In a general context video, the key frame is typically selected as either (1) the $n^{th}$ frame in a sequence of video frames, where n is a predetermined value, (2) the frame which corresponds to a zoom, or (3) the frame which corresponds to a stable (non-moving) scene, which may be interpreted by conventional key frame selection algorithms as a significant frame in the sequence.

According to the invention, the novel key frame selection algorithms are based on the periodic nature of the echo videos (which are, in turn, derived from the periodic nature of the heart function, described above.) In order to observe the periodic nature of a particular view, one particular recognition feature must be selected which is observed repeatedly in the frames of each view. As described above, the key frame of each view corresponds to the end-diastole of each heart cycle. Since tracking the cardiac chambers in order to find the most expanded state of the heart at the end-diastole phase is a difficult task, the key frame selection algorithms may use one or more of several methods to identify this frame.

Key frame selection may be achieved by use of the ECG wave information which is included at the bottom of each frame. Thus, in order to select the key frame corresponding to the end-diastole phase, the procedure according to the invention will extract the location of the R-wave peak in the ECG graph, and locate the end-diastole phase just after the R-wave peak.

Figure 2:
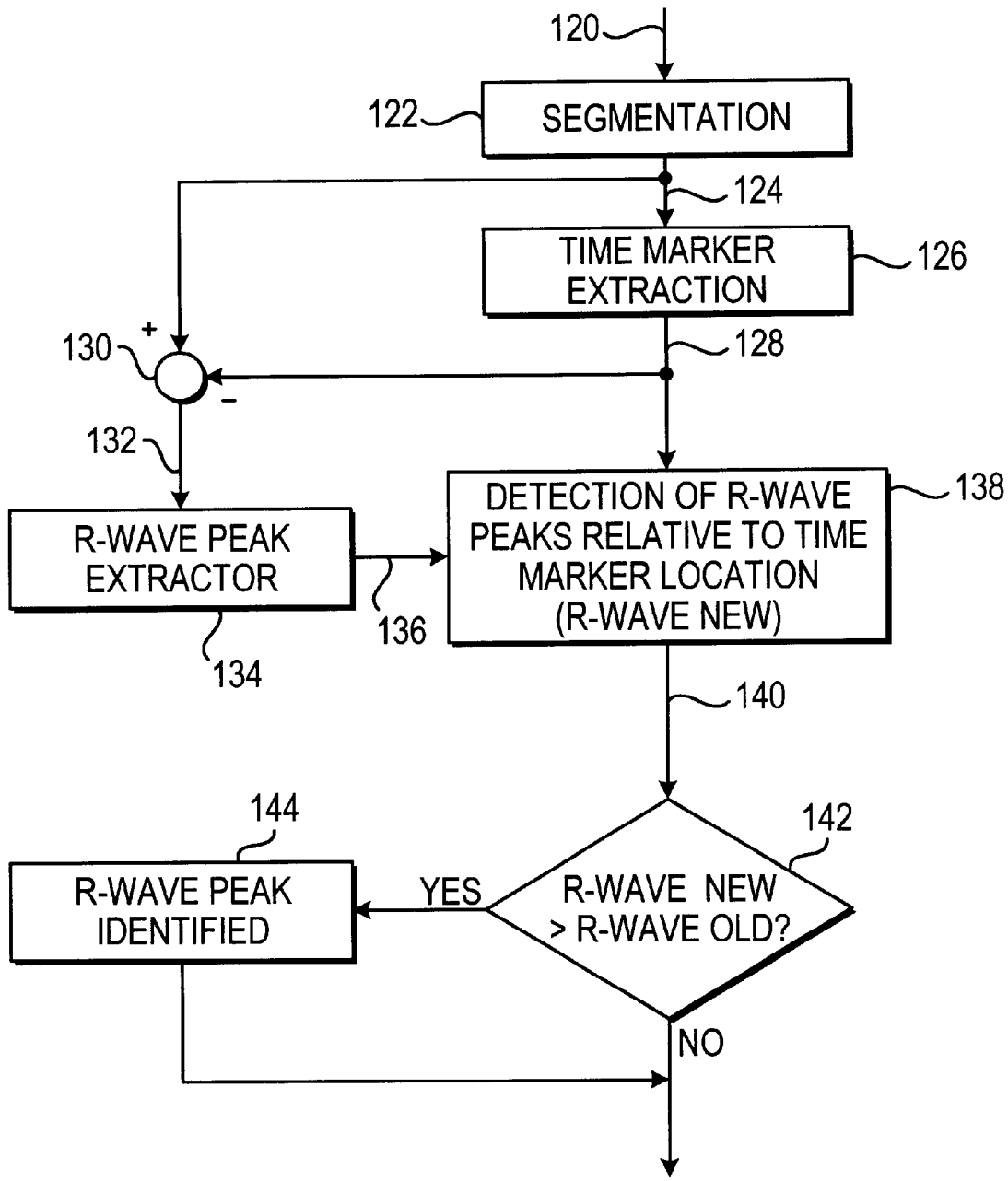
FIG. 2 is a flowchart illustrating an exemplary procedure for detecting the occurrence of an R-wave peak in the electrocardiograph wave, in accordance with the invention.
Figure 3A:
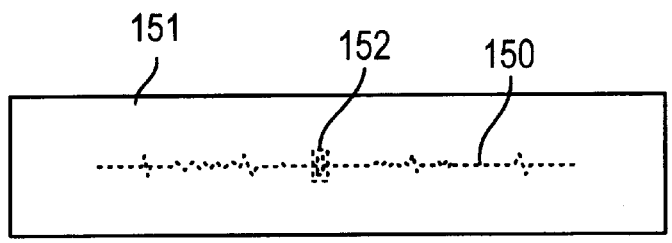
FIGS. 3(a)–3(e) are exemplary views of the electrocardiograph waves as processed by procedure illustrated in FIG. 2, in accordance with the invention.
Figure 3B:
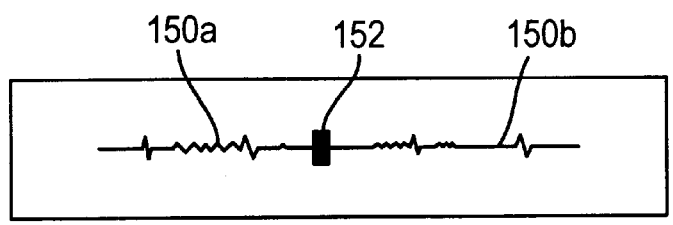
Figure 3C:
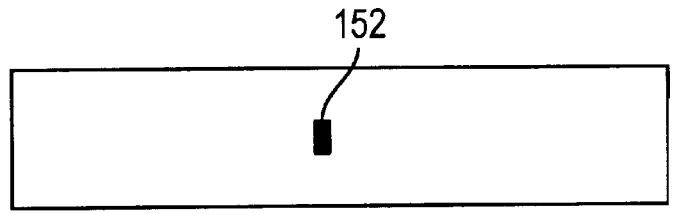
Figure 3D:
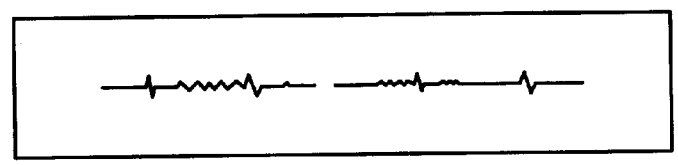

A flow chart in accordance with a preferred embodiment is illustrated in FIG. 2 in connection with FIGS. 3(a)–3(e). The ECG wave 150 is illustrated in FIG. 3(a), and is represented on line 120 of FIG. 2. A first stage in the analysis procedure is to use a known process of segmentation 122 on the ECG wave 150. Typically this is necessary where there is low contrast between the ECG wave 150 and the background 151. The ECG graph is transformed by the segmentation process into a bi-level image represented on line 124, i.e., an image having two gray levels, which allows for more accurate processing. Gray level segmentation, or a similar equivalent process, may be performed to create the bi-level image. (The bi-level image is illustrated in FIG. 3(b).)

A next step is extraction of the time marker at step 126. The ECG wave 150 typically has a time marker 152, which moves across the ECG waveform to refresh the image over time. Thus the portion 150a of the waveform to the left of the time marker is current data, and the portion 150b to the right of the time marker 152 is old data from the last sweep. Therefore, the algorithm will only consider the R-wave peaks to the left of the time marker. Time marker extraction may be accomplished through a set of morphological operations with a specific structural element (SE), such as a vertical rectangular shape approximating the time marker 152. A morphological approach to extract the time marker is preferred due to the special structure of the time marker, which is always a vertically-oriented rectangle for ECG waves. In particular, the time marker 152 is extracted by eroding the image of the ECG by a vertical rectangular SE, as is known in the art. A reference location is then calculated the centroid of the time marker 152. The resulting image is represented on line 128 and illustrated in FIG. 3(c). The time marker 152 may then be subtracted from the ECG graph image 150 at step 130 by superimposing the time marker 152 over the ECG waveform 150. The resulting waveform is represented on line 132 of FIG. 2, and illustrated in FIG. 3(d).

Figure 3E:
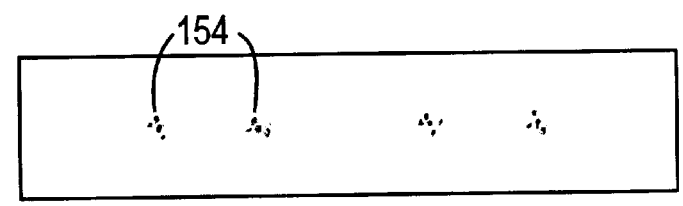

The R-waves are identified at step 134. As previously described, the location of the R-waves of the ECG graph closely correspond to the end-diastole of the heart cycle. Identification of the R-waves may be achieved by a process of erosion of the ECG image of FIG. 3(d) with a SE having a shape similar to an upward arrow. The SE typically fits the ECG image in the vicinity of the R-wave peak at more than one location. Consequently, a number of locations are identified rather than a single point. (See, FIG. 3(e) illustrates a plurality of points 154 for each R-wave location. Subsequently, the plurality of points for each R-wave peak may be clustered together such that every R-wave peak is only represented by a single point. A K-means clustering algorithm with an automatic method for finding the number of clusters is used to aggregate the points together. A preferred algorithm for clustering the points together is as follows, and illustrated in FIG. 4: At step 170, the number of clusters is initialized to N, where N is the total number of points. At step 172, the distance between any two clusters is determined. Next, it is determined whether a ratio of the distances between two clusters, i.e., the percentage difference between a current value and a previous value, is less than a threshold T at step 174. If the ratio is smaller than threshold T, the two closest clusters are merged and the center of the new merged cluster is set as the mean of the locations of the two original clusters at step 176. Subsequently, the number of clusters N is reduced to N−1 at step 178, and the algorithm returns to step 172. If the answer to the query at step 174 is negative, the algorithm stops (step 179). The value of threshold T is set by considering the intra and inter-cluster distances. (The inter-cluster distance is the equal to the distance from one R-wave peak to the other, and the maximum intra-cluster distance is the diameter of a circle enclosing all the points representing one R-wave peak.) The value of T=0.9 was achieved experimentally, such that the bunch of points that are more compact than 10% of the distance between two consecutive R-wave peaks are regarded as one point. As a result of the operations of FIG. 4, the image consists only of one point for each R-wave.

Figure 4:
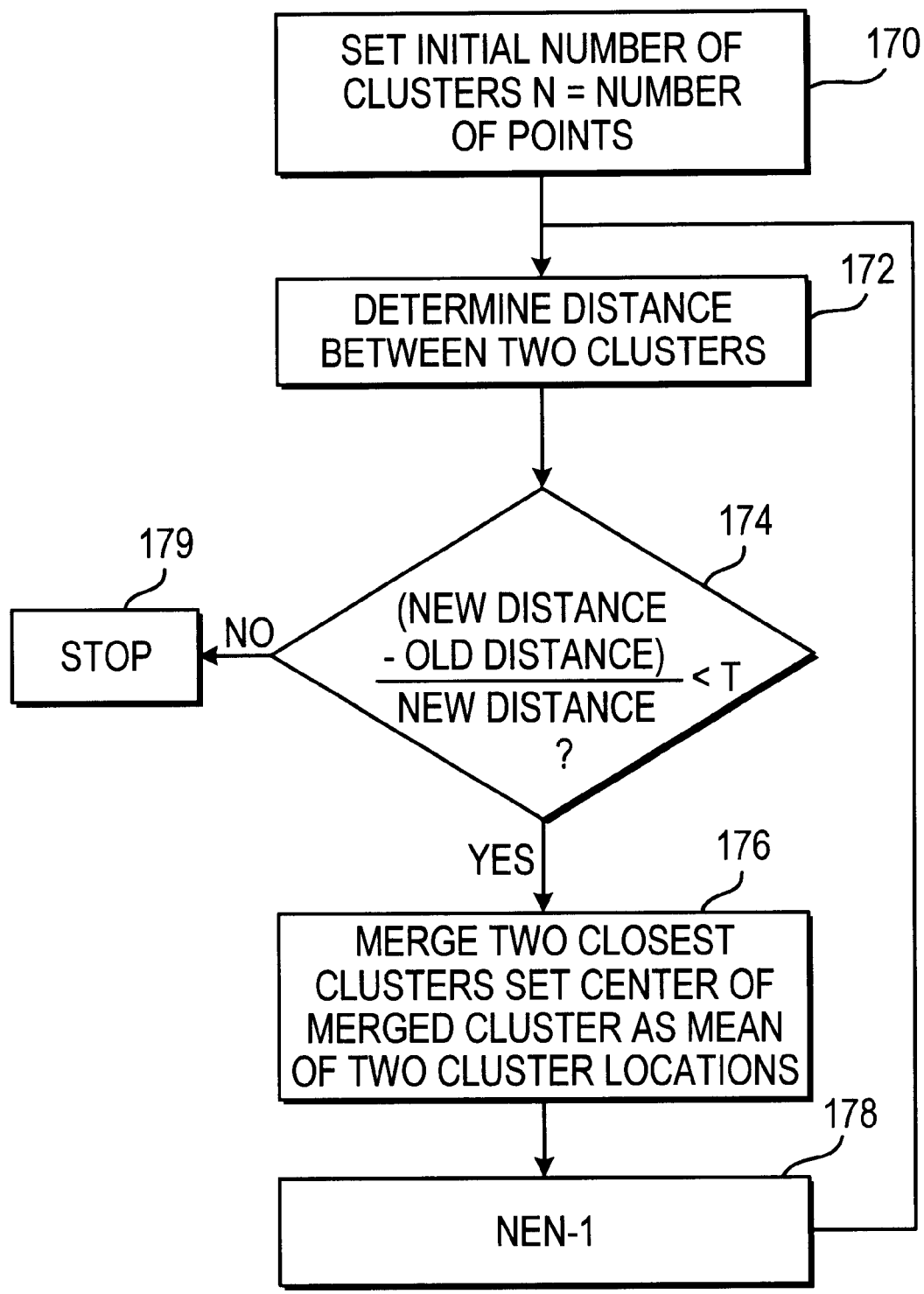
FIG. 4 is a flowchart of exemplary steps performed to cluster the R-wave peak locations in accordance with the invention.

With continued reference to FIG. 4, steps 126 and 134 identify the locations of the R-wave peaks 154 and the centroid of the time-marker 152. Since the time-marker sweeps the ECG graph from left to right, the new peaks are to the left of the time-marker. At step 138, the number of R-wave peaks to the left of the time-marker are counted for a frame, $(Rwave)_{new}$ and this number is represented on line 140. At step 142, the number of R-wave peaks for the previous frame, i.e., $(Rwave)_{old}$ is compared with the current number of R-wave peaks, i.e., $(Rwave)_{new}$. If the number of R-wave peaks increases by one, i.e., $(Rwave)_{new} > (Rwave)_{old}$, the system determines that the time marker has passed over an R-wave and that a key frame has been detected (step 144).

Due to the periodic nature of the heart function, there may be several heart cycles in the echo video. Thus there will be a key-frame selected for each heart cycle. As will be described below, the key-frame selected for inclusion in the summary may be the last detected key-frame for a particular view.

Following the key-frame selection, the view boundary detector will monitor a recognition feature in each view, and detect an approximate view boundary range when a change occurs in that recognition feature between two key frames. In order to locate the view boundary at the video frame level, the view boundary detector will subsequently observe all video frames between the two key frames. The view boundary is detected when a change in the recognition feature is observed between adjacent frames. (Alternatively, it is contemplated that the view boundary detector may observe all video frames, and detect the location of the view boundary by observing a change in the recognition feature between adjacent frames.)

Based on the domain knowledge with respect to the structure of the echo videos, a preferred recognition feature may be the frame type associated with each of the echocardiogram views. The algorithm recognizes six different types of frames:

Type I: Standard black-and-white views with triangular image window.

Type II: Black-and-white zoom views with rectangular image window.

Type III: Black-and-white zoom views with trapezoidal image window.

Type IV: Black-and-white Doppler views with a rectangular image window.

Type V: Color views with triangular image window.

Type VI: Blank frame

The type of the frame may be determined by the image window shape and by the color content of the frames.

Figure 5:
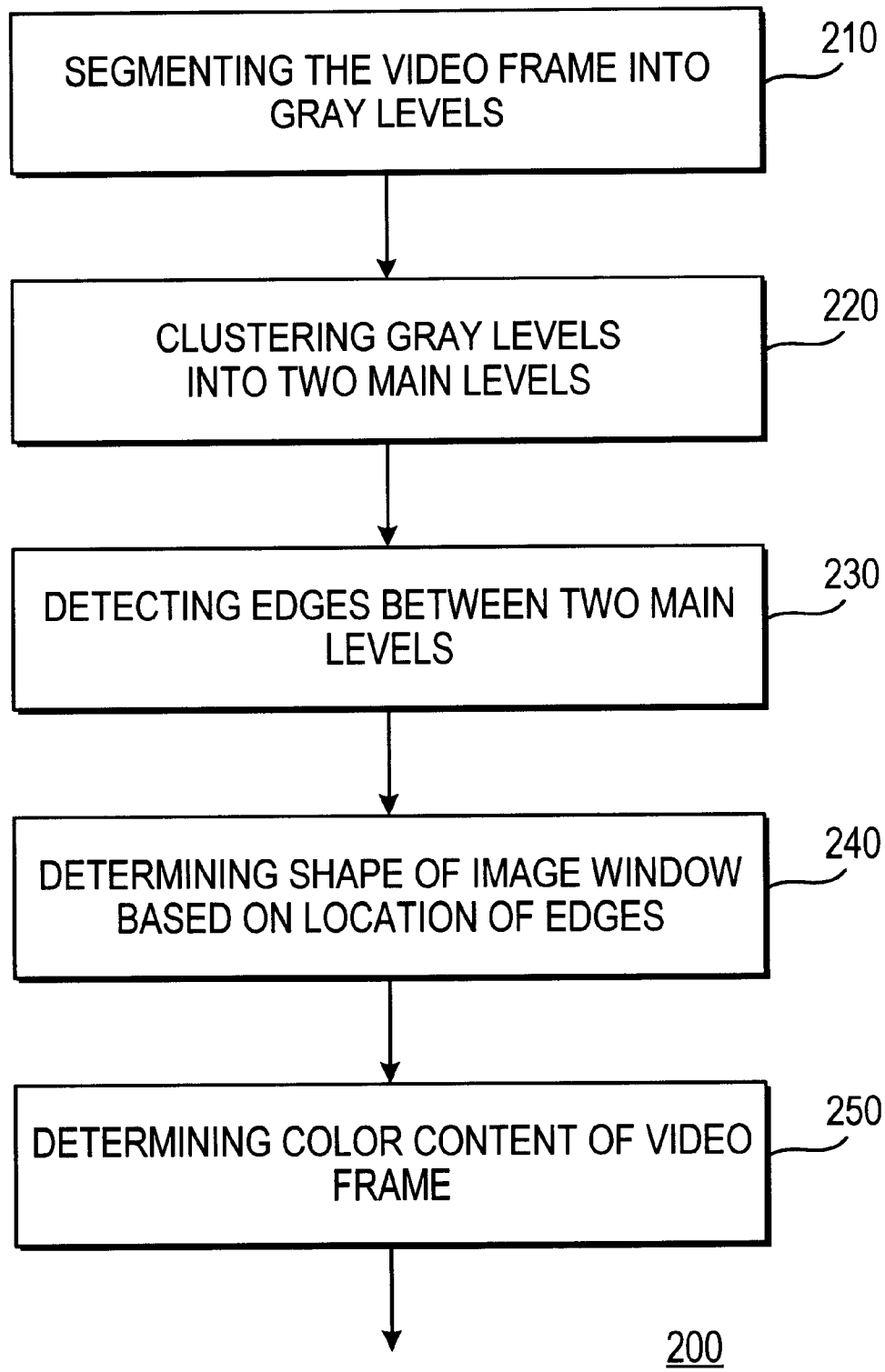
FIG. 5 is a flowchart of exemplary steps performed to categorize the type of echocardiogram view in accordance with the invention.

A procedure according to the invention for determining the frame type is illustrated in the process 200 in FIG. 5. In order to find the frame shape, the gray levels of each frame may be clustered into two main levels: a first main level representing the background, i.e., those areas outside the echo image window, and a second main level representing the image window and the text areas. According to a preferred embodiment, this procedure may be performed as follows: at step 210, each frame is first segmented to five initial gray levels using a K-means clustering algorithm. Five initial levels for the initial cluster centers are chosen from experimentation because visually there are five different areas in a typical echo video. In particular, a first initial level may be the background areas, which surround the image window. A second initial level may be the areas corresponding to the boundaries of the heart, which have the highest pixel valves. A third initial level corresponds to the black areas, which denote such objects as the ventricular areas, and finally, the fourth and fifth initial levels are associated with two levels of gray between the boundaries of the heart and the ventricular areas, which are associated with the heart muscles.

Figure 6:
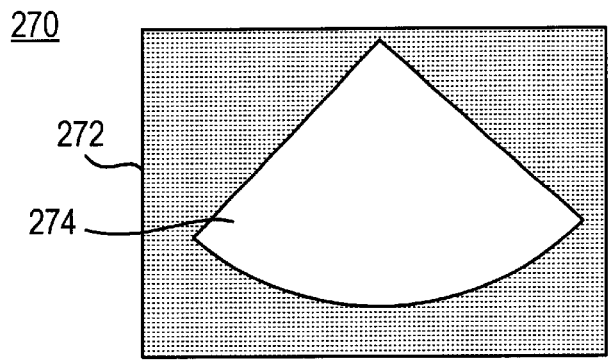
FIG. 6 is a typical echocardiogram view which has been segmented in a bi-level image in accordance with the invention.
Figure 7A:
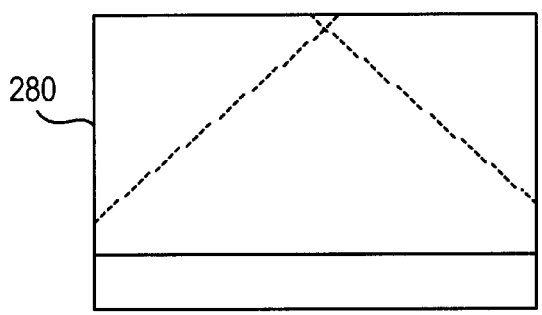
FIGS. 7(a)–7(d) are typical shapes of views associated with the echocardiogram videos in accordance with the invention.
Figure 7B:
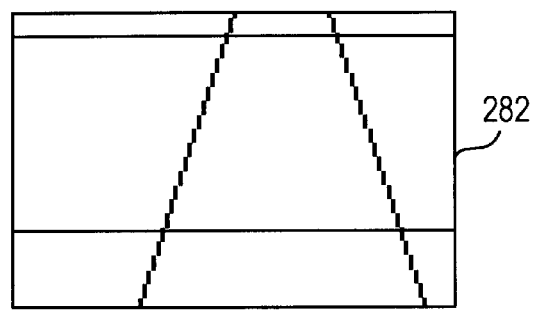
Figure 7C:
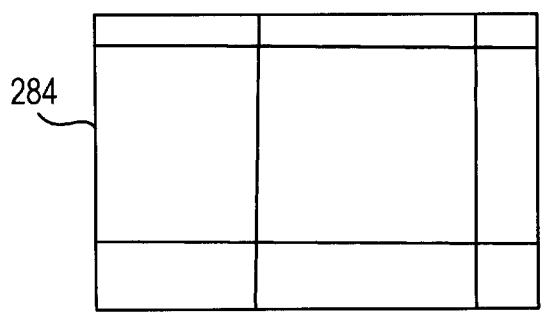
Figure 7D:
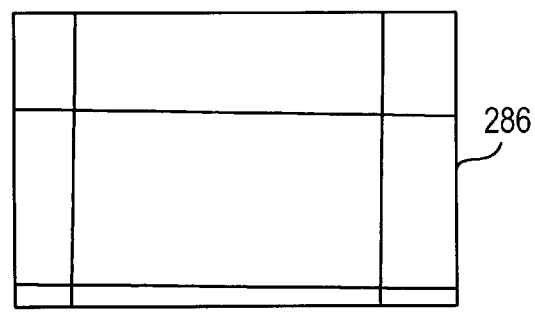

Subsequently, at step 120, the gray levels are clustered into two main levels. The largest cluster is regarded as the background (first main level), and the other four are merged together to form the foreground (second main level). This resulting bi-level frame is then dilated and median filtered in order to close the small holes in the foreground regions. As illustrated in FIG. 6, the bi-level frame 270 is produced having a smooth background 272, which masks the image window and the text areas of the frames, and the foreground 274, which contains the region of interest (ROI).

Subsequently, step 230 of FIG. 5 comprises detecting the boundaries, or edges, between the foreground ROI and the background. According to a preferred embodiment, the resulting image is passed through an edge detector module and subsequently through a line detector incorporating the Hough transform method, or equivalent known process. An output is produced comprising several vertical, horizontal, or angled lines which represent the edges of the echo image window. Based on the different possible combinations of these lines and their crossing locations, the detected lines in each video frame are compared with each one of four pre-defined shapes at step 140. The four predefined shapes are illustrated in FIGS. 7(*a*)–7(*d*). The triangular image window 280 is illustrated in FIG. 7(*a*). The trapezoidal image window 282 is illustrated in FIG. 7(*b*), a first rectangular image window 284 is illustrated in FIG. 7(*c*), and a second rectangular image window 286 is shown in FIG. 7(*d*). Each predefined shape includes information on the locations of the edge lines. The video frame whose detected edge lines match the lines of a predefined shape are categorized as that shape. At step 250, the color content of the frame is determined. More particularly, the color content of the frame is summed, and if the summed color content exceeds a threshold (typically zero), the color content variable is assigned a non-zero value. If the color content is zero, the color content variable is assigned a value of zero. The frame type is the feature that is observed in each of the video frames. A view boundary is found when a change is detected in either the type of view or the color content between adjacent video frames.

The above procedures may be performed in real time. Alternatively, each frame may be down-sampled prior for processing in order to speed up the process. According to a preferred embodiment, the original captured video is CIF of size 352×240, and the image may be reduced by a down-sampling factor of four (i.e., 88×60). It has been found through experimentation, that the factor of four offers an optimum trade-off between speed and the accuracy of the line-detection algorithm.

Figure 8:
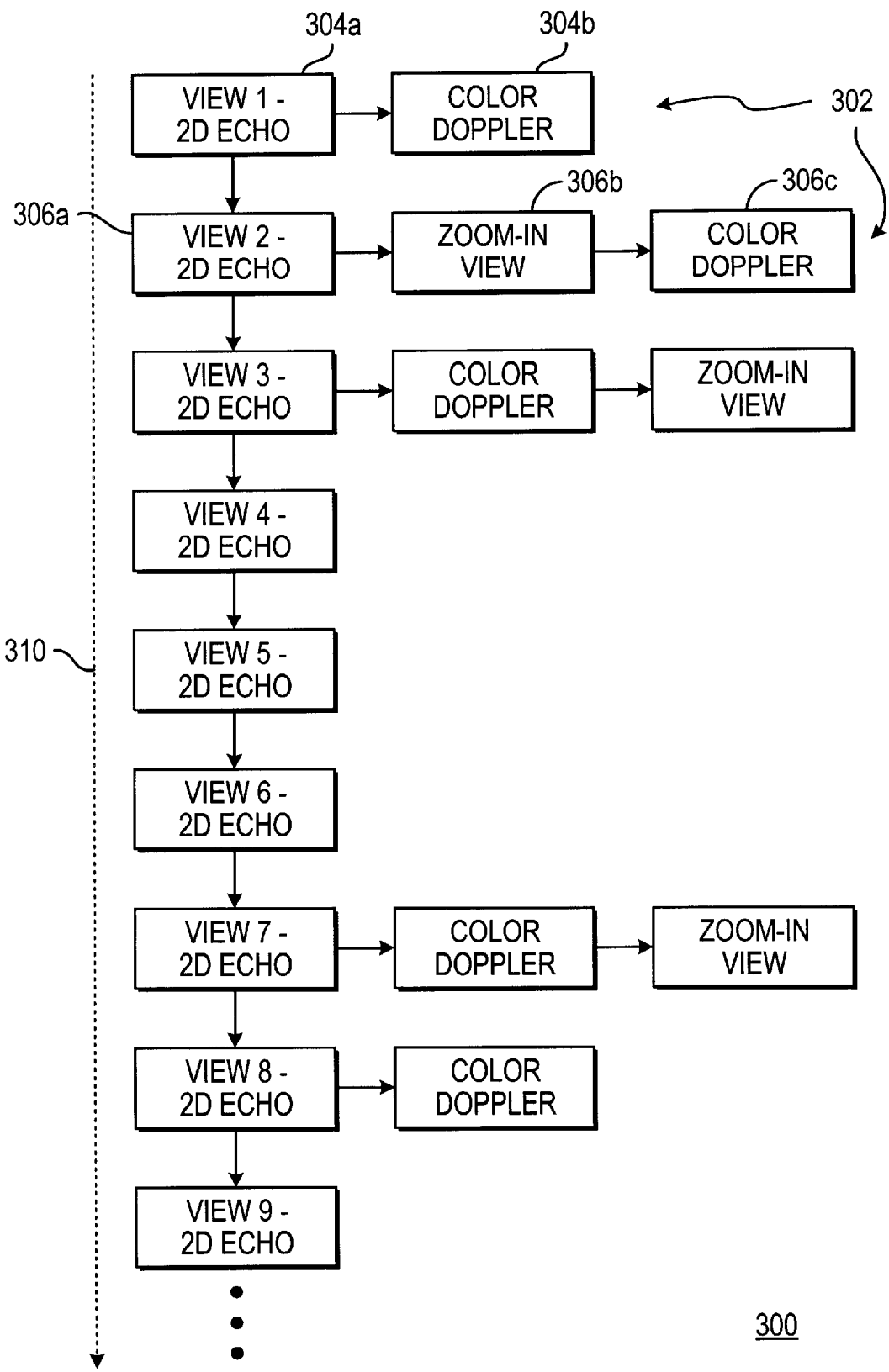
FIG. 8 is a diagram illustrating an exemplary static summary of an echocardiogram video in accordance with the invention.

Upon identifying the key frames, a next step in the procedure is to create a summary table. The summary allows the user to view the important video frames of the echo video at a glance, instead of watching the full-length video. The important video frames are those which correspond to the occurrence of the recognition features described above. The first type of summary is the static summary, which includes an individual video frame for each view. After the key-frame selection process and view-boundary detection process are completed, the summary generator may use the last key frame for a particular view as the key frame. The term "static" summary is used because the motion of the heart is not captured in this representation. A possible format for the static summary is the storyboard format illustrated in FIG. 8. As illustrated in FIG. 8, the static summary includes a plurality of key frames in several groups 302. The echo study may begin with a key frame 304*a* comprising the standard 2D echocardiogram view. A key frame 304*b* corresponding to a color Doppler views associated with that standard 2D view is grouped with key frame 304*a* corresponding to the standard 2D echocardiogram view. From there, the echo study may proceed to another key frame 306*a* corresponding to the next standard 2D echocardiogram view, which is grouped with the associated zoom view key frame 306*b* and color Doppler key frame 306*c*. The key frames are arranged in chronological order from top to bottom as indicated by arrow 310.

This pattern of view transitions is then typically followed for each view of the echocardiogram video. The PSA views are one exception to this sequence, in that they are all standard 2D echocardiogram views without associated color Doppler or zoom-in views. The advantage of the presenting the content of the echo video in the form of the static summary to the user is that the user can have random access to the different views of the video. By choosing any of the representative images in the summary, the system plays the video clip of the corresponding view of the echo video.

Figure 9:
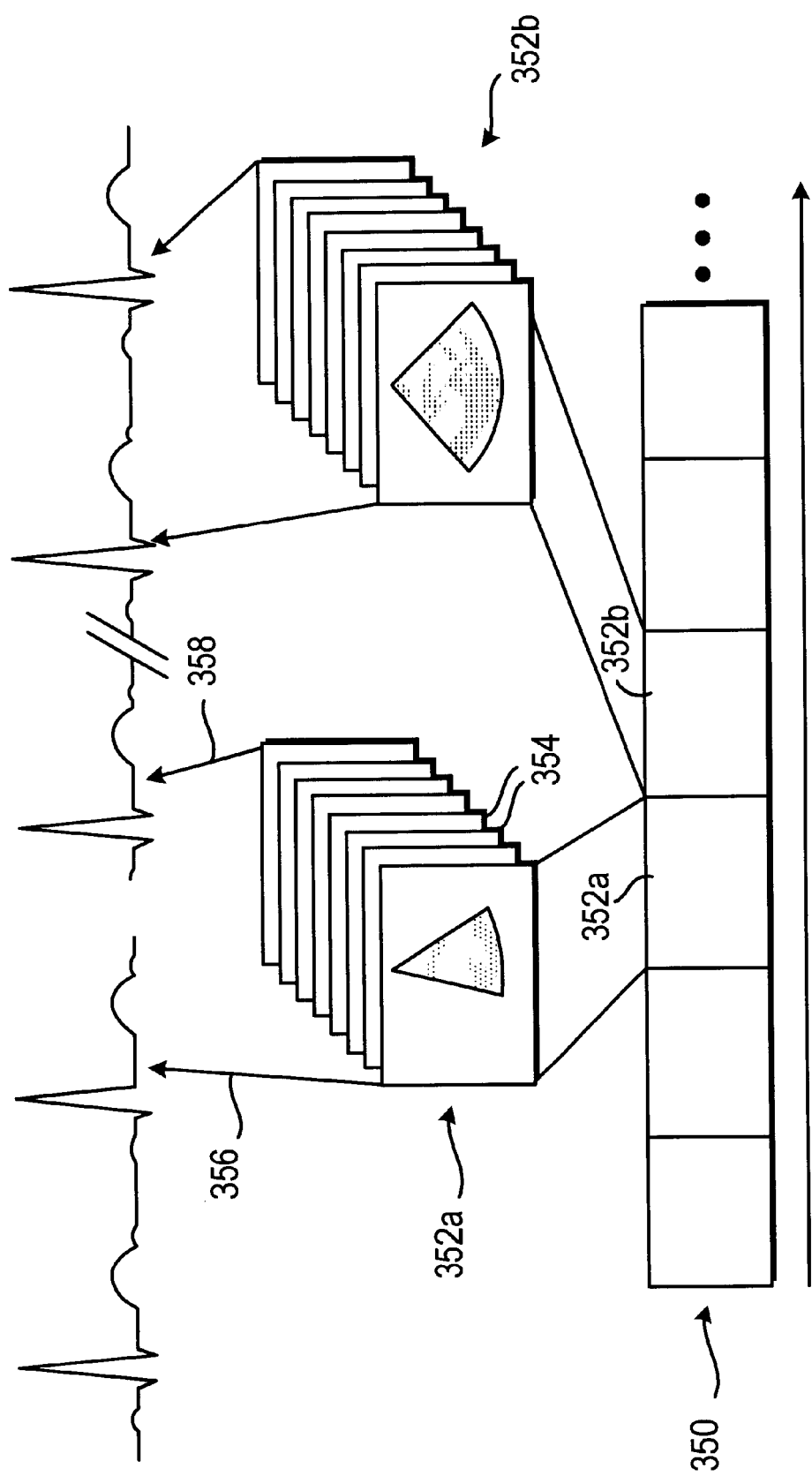
FIG. 9 is a schematic diagram illustrating an exemplary procedure for generating a dynamic summary of an echocardiogram video in accordance with the invention.

Since the motion of the heart throughout time may convey more information about the status of the heart and its valves than the static key frames, it is may be beneficial to the user to be provided with a dynamic summary as well. A dynamic summary captures the repetitive nature of the echocardiogram, and the heart function. As illustrated in FIG. 9, the dynamic summary 350 is constructed by taking a subset 352*a*/352*b* of video frames 354 corresponding to a single heart cycle. The subsets of video frames are concatenated to form a sequence of subsets. Due to the repetitive nature of the heart motion, in most of the cases, one cycle from each view may carry complete information about that view. The dynamic summary therefore is an echo video skim. This is a very efficient way of summarizing the echo video, because it both captures the motion of the heart and enough information to decide which shots are more important for the diagnosis purposes.

In order to make the dynamic summary, the subset 352*a* of video frames is selected from each view which correspond to a cycle between two consecutive video frames. As described above, each heart cycle is limited in the frame sequence by two boundaries, which correspond to the key frames, or more particularly, to the end-diastole of the heart operation. Thus, each subset of video frames is bounded at the beginning by a first occurrence 356 of the end-diastole and at the end by the second occurrence 358 of the end-diastole. The number of subsets included in the dynamic summary can be variable and can be adjusted based on a request from the physician, as will be described in greater detail below.

Figure 10:
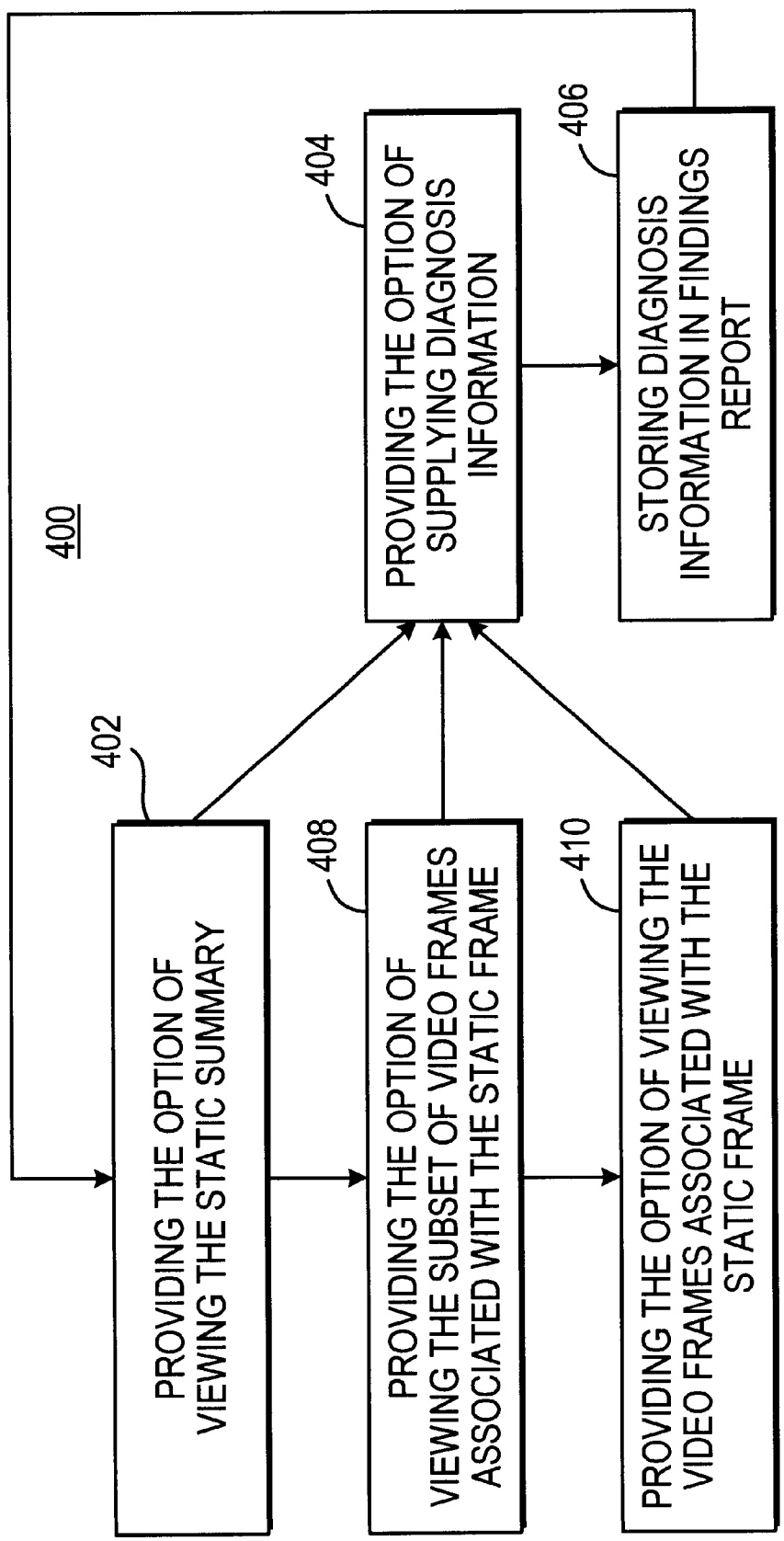
FIG. 10 is a flowchart illustrating the options presented to the physician in order to allow the physician to supply diagnosis information in a findings report in accordance with the invention.

The physician or specialist will make the diagnosis by reviewing the static and dynamic summaries. The physician or specialist may be on-site with the patient and the echocardiogram apparatus. Alternatively, the physician may be at a remote location. In order to make a diagnosis, the system may be provide a task flow 400, as illustrated in FIG. 10. The physician may be provided with the option of viewing the individual video frames in the static summary at step 402. During this step, the physician may view the static key frame for each view. At step 404, the physician may be provided with the option of supplying diagnosis information after viewing the static summary. Such information is stored in a diagnosis report at step 406.

The individual video frames of the static summary are associated with, or linked to, the subset of video frames in the dynamic summary, i.e., a short sequence of video frames bounded by a first occurrence of the end-diastole and by a second occurrence of the end-diastole ("R-R cycle"). At step 408, the physician is provided with the option of viewing the subset of video frames in the echo study which are associated with a selected static frame. The ability to view additional video frames for a single view may assist the physician in making the diagnosis, without the necessity of viewing the entire echo study. Following step 408, the physician is again provided with the option of supplying diagnosis information at step 404. The individual video frames as well as the respective subset of video frames may be associated with, or linked to, all of the video frames for a particular view which includes the subset. A next step may be to provide the physician with the option of viewing all the video frames associated with the individual static video frame (step 410). During this step, the physician may view all of the video frames corresponding to a particular view. As with each of the previous steps, the physician is again provided with the option of supplying diagnosis information at step 404 after viewing the video frames.

A further step in the process may be to provide the physician with the option of creating a findings report. An exemplary findings report 500 is a general report for a patient 501 on the status of different parts and objects of the heart and the possible abnormalities associated with them, based on what the physician perceives from viewing the summaries (see, FIG. 11). The system provides a link between the terms referring to the objects or abnormalities in the findings report 500 and the views that best convey the information about them. The domain knowledge previously acquired provides information in the form of a table of correspondence (as illustrated in FIG. 2(*a*), above). Thus it is possible to relate each object of the heart described in the findings report to those views in the echo study which best convey visual information about that abnormality. Thus each of the items 502, 504, 506, and 508 are linked to those views which illustrate that object of the heart. For example, the system provides an association between item 504 and those views which illustrate the aorta as provided by the table of correspondence. Based on the table of correspondence illustrated in FIG. 2(*a*), a link, or an association, would be provided to the Parasternal Long Axis View, the Parasternal Short Axis View, and the Apical 3 Chamber View, such that the physician would be able to see views which illustrate the object of the heart of interest.

The patient's echo study and its related diagnosis and summary can be called up by an end user, such as the patient's physician, by entering the patient's ID. From there the user is provided with the option of viewing the static summary, of viewing the dynamic summary, or of viewing the full-length version of the views. These options are substantially identical to the options provided to the physician in FIG. 10, above. Moreover, the end user would be able to review the findings report 500 (see, FIG. 11) and would be able to select any of the items 502, 504, 506, and 508 and look at views which correspond to the item selected.

One goal of remote medicine is to send the patient's data including the results of the medical imaging procedures to the diagnosis site for the physician to review and diagnose. The tele-imaging applications usually suffer for the bandwidth problems and its conflict with the high demand on the quality of the medical images and videos.

The system according to the invention described herein is very useful for tele-echo imaging applications and remote diagnosis of the echo videos. It solves the problem of bandwidth scarcity and image quality in its own way. Also with the advent of portable echo capture devices; the integration of such devices and our system will make a very efficient device for handling the echo videos for the tele-imaging applications.

The current system allows a progressive study of the remotely captured echo videos. The technician captures the patient's echo, the system performs the view-boundary detection, the key frame selection, and creates the summary.

Both the static and the dynamic summary of the echo study will be transmitted to the expert's site. Both summaries will need a minimum amount of bandwidth when transmitted through the network because the static summary is just a collection of a few representative frames and the dynamic summary is a highly abstracted version of the full length of the echo video.

Upon viewing this summaries the expert can ask the system at the measurement site to send that specific views that he suspects to show any abnormalities, and not the whole echo study of the patient. In this manner, it takes much less time for the expert to review the remotely captured echo video.

The physician can add his diagnosis to the captured echo video and send it to the measurement site if needed, or the report can be stored at the specialist site and integrated with the videos later. The system in the measurement site links the important terms in the findings sent by the physician to their corresponding views. This information can later be downloaded to the hospital's central archive system for future use.

It is also noteworthy that the communication of the summaries between the remote and the expert site is a good alternative to creating sophisticated compression schemes instead of sending the full-length echo videos over the communication channel.

It will be understood that the foregoing is only illustrative of the principles of this invention, and that various modifications can be made by those skilled in the art without departing from the scope and spirit of the invention.

What is claimed is:

1. A method for processing an echocardiogram video of a patient's heart, the echocardiogram video comprising a first sequence of consecutive video frames corresponding to a first view of the patient's heart concatenated with a second sequence of consecutive video frames corresponding to a second view of the patient's heart, the method comprising:

receiving the first sequence of consecutive video frames and the second sequence of consecutive video frames;

monitoring a first feature in each one of the video frames of the first and second sequences of consecutive video frames;

selecting a video frame in each of the first sequence of consecutive video frames and the second sequence of consecutive video frames corresponding to an occurrence of the first feature in each of the first sequence of consecutive video frames and the second sequence of consecutive video frames;

monitoring a second feature in the first sequence of consecutive video frames and the second sequence of consecutive video frames;

detecting a transition between the first sequence of consecutive video frames and the second sequence of consecutive video frames by determining a change in the second feature between adjacent video frames; and generating a summary comprising video frames selected in the selecting step.

2. The method as recited in claim 1, wherein the first feature is the occurrence of the end-diastole phase of the patient's heart cycle and wherein monitoring the first feature in the first sequence of consecutive video frames and the second sequence of consecutive video frames comprises:

detecting the occurrence of the end-diastole phase of the patient's heart cycle.

3. The method as recited in claim 1, wherein each video frame includes an associated electrocardiograph wave and wherein the first feature is the occurrence of an R-wave peak in the electrocardiograph wave of a video frame and wherein monitoring the first feature in the first sequence of consecutive video frames and the second sequence of consecutive video frames comprises:

monitoring the electrocardiograph wave associated with each video frame.

4. The method as recited in claim 3, wherein selecting the video frame in each of the first plurality of video frames and the second plurality of video frames corresponding to an occurrence of the first feature in each of the first sequence of consecutive video frames and the second sequence of consecutive video frames comprises:

detecting an occurrence of the R-wave peak in the electrocardiograph wave corresponding to each one of the first and second sequences of consecutive video frames.

5. The method as recited in claim 4, wherein the electrocardiograph wave comprises a time marker on the electrocardiograph wave indicating the position on the electrocardiograph wave corresponding to current electrocardiograph information and wherein detecting the occurrence of the R-wave peak in the electrocardiograph wave for each of the first plurality of video frames and the second plurality of video frames comprises:

detecting the location of the time marker in the electrocardiograph wave in each video frame;

monitoring the location of R-wave peaks in the electrocardiograph wave in each video frame; and detecting when one of the R-wave peaks substantially coincides with the time marker.

6. The method as recited in claim 1, wherein each of the first sequence of consecutive video frames and the second sequence of video frames comprises an image window having one of a plurality of predefined shapes, wherein the second feature is the shape of the image window and wherein monitoring the second feature comprises:

detecting the shape of the image window in each of the video frames of the first and second sequences of consecutive video frames.

7. The method as recited in claim 6, wherein detecting the transition between the first sequence of consecutive video frames and the second sequence of consecutive video frames comprises:

detecting the occurrence of a change in the shape of the image window between adjacent video frames.

8. The method as recited in claim 6, wherein detecting the shape of the image window in each one of the video frames of the first and second sequences of consecutive video frames comprises:

segmenting the video frame into a plurality of gray levels;

clustering the plurality of gray levels into two main levels comprising the image window as one of the main levels and a background as the other of the main levels;

detecting a location and an orientation of a plurality of edges between the image window and the background; and determining the shape of the image window based on the location and the orientation of the plurality of edges.

9. The method as recited in claim 1, wherein the second feature is the color content of each one of the video frames and wherein monitoring the second feature comprises:

monitoring the color content of each one of the video frames.

10. The method as recited in claim 9, wherein detecting the transition between the first sequence of consecutive video frames and the second sequence of consecutive video frames comprises:

detecting the occurrence of a change in the color content between adjacent video frames.

11. The method as recited in claim 1, wherein generating the summary comprises:

generating a sequence of individual video frames corresponding to the occurrence of the first feature in each of the first sequence of consecutive video frames and the second plurality of consecutive video frames.

12. The method as recited in claim 11, further comprising:

providing an association between each individual video frame of the summary and the corresponding sequence of consecutive video frames that includes the individual video frame.

13. The method as recited in claim 11, wherein generating the summary further comprises:

generating a first subset of the first sequence of consecutive video frames bounded by a first occurrence of the first feature and a second occurrence of the first feature, wherein the first subset includes the individual video frame corresponding to the occurrence of the first feature in the first sequence of consecutive video frames;

generating a second subset of the second sequence of consecutive video frames bounded by a first occurrence of the first feature and a second occurrence of the first feature, wherein the second subset includes the individual video frame corresponding to the occurrence of the first feature in the second sequence of consecutive video frames; and generating a sequence of the subset of the first sequence of consecutive video frames and the subset of the second sequence of consecutive video frames.

14. The method as recited in claim 13, further comprising:
providing an association between each individual video frame of the summary, and the corresponding subset that includes the respective individual video frame.

15. A method for processing an echocardiogram video of a patient's heart for diagnosis by a physician, the echocardiogram video comprising a first sequence of consecutive video frames corresponding to a first view of the patient's heart concatenated with a second sequence of consecutive video frames corresponding to a second view of the patient's heart, the method comprising:
receiving the first sequence of consecutive video frames and the second sequence of consecutive video frames;
monitoring a first feature in each one of the video frames of the first sequence of consecutive video frames and the second sequence of consecutive video frames;
selecting a video frame in each of the first plurality of video frames and the second plurality of video frames corresponding to an occurrence of the first feature in each of the first sequence of consecutive video frames and the second sequence of consecutive video frames;
monitoring a second feature in the first sequence of consecutive video frames and the second sequence of consecutive video frames;
detecting a transition between the first sequence of consecutive video frames and the second sequence of consecutive video frames by determining a change in the second feature between adjacent video frames;
generating a summary comprising video frames selected in the selecting step;
providing the summary to the physician for viewing; and
providing the physician with the option, after viewing the summary, of supplying diagnosis information related to a plurality of predetermined structures of the patient's heart that are visible in the first and second sequences of consecutive video frames.

16. The method as recited in claim 15, further comprising:
providing an association between each of the plurality of predetermined structures of the patient's heart and the corresponding one of the first and second sequence of consecutive frames in which each of the plurality of predetermined structures of the patient's heart is visible.

17. The method as recited in claim 16, further comprising:
after providing the physician with the option of supplying diagnosis information, providing an association between of the diagnosis information related to a plurality of predetermined structures of the patient's heart supplied in the supplying step with the corresponding one of the first and second sequence of consecutive frames in which each of the plurality of predetermined structures of the patient's heart is visible.

18. The method as recited in claim 15, wherein generating the summary occurs at one location and providing the summary to the physician comprises:
transmitting the summary to the physician at a second location remote from the first location.

19. A system for processing an echocardiogram video of a patient's heart, the echocardiogram video comprising a first sequence of consecutive video frames corresponding to a first view of the patient's heart concatenated with a second sequence of consecutive video frames corresponding to a second view of the patient's heart, the system comprising:
video data storage for receiving the first sequence of consecutive video frames and the second sequence of consecutive video frames;
a programmed processor comprising:
a key frame selector configured to monitor a first feature in each one of the video frames of the first sequence of consecutive video frames and the second sequence of consecutive video frames, and select a video frame in each of the first sequence of consecutive video frames and the second sequence of consecutive video frames corresponding to an occurrence of the first feature in each of the first sequence of consecutive video frames and the second sequence of consecutive video frames;
a view boundary detector configured to monitor a second feature in the first sequence of consecutive video frames and the second sequence of consecutive video frames from said video data storage, detect a transition between the first sequence of consecutive video frames and the second sequence of consecutive video frames by determining a change in the second feature between adjacent video frames; and
summary generator configured to generate a summary comprising video frames selected by the key frame selector.

20. The system as recited in claim 19, wherein the first feature is the occurrence of an end-diastole phase of the patient's heart cycle and wherein the key frame selector is configured to monitor the occurrence of the end-diastole phase of the patient's heart cycle.

21. The system as recited in claim 19, wherein each video frame includes an associated electrocardiograph wave and wherein the first feature is the occurrence of an R-wave peak in the electrocardiograph wave of a video frame and wherein the key frame selector is configured to monitor the electrocardiograph wave associated with each one of the video frames of the first and second sequences of consecutive video frames.

22. The system as recited in claim 21, wherein the key frame selector is configured to detect an occurrence of the R-wave peak in the electrocardiograph wave corresponding to each of one of the first sequence of consecutive video frames and the second sequence of consecutive video frames.

23. The system as recited in claim 22, wherein the electrocardiograph wave comprises a time marker on the electrocardiograph wave indicating the position on the electrocardiograph wave corresponding to current electrocardiograph information and wherein the key frame selector is configured to detect the location of the time marker in the electrocardiograph wave in each video frame; to detect the location of R-wave peaks in the electrocardiograph wave in each video frame; and to detect when one of the R-wave peaks substantially coincides with the time marker.

24. The system as recited in claim 19, wherein each of the first sequence of consecutive video frames and the second sequence of video frames comprises an image window having one of a plurality of predefined shapes, wherein the second feature is the shape of the image window, and wherein the view-boundary detector is configured to detect the shape of the image window in each video frame.

25. The system as recited in claim 24, wherein the view boundary detector is configured to detect the occurrence of a change in the shape of the image window between adjacent video frames.

26. The system as recited in claim 22, wherein the view boundary detector is configured to segment each one of the video frames into a plurality of gray levels, cluster the plurality of gray levels into two main levels comprising the image window as one of the main levels and a background as the other of the main levels; detect a location and an orientation of a plurality of edges between the image window and the background; and determine the boundaries of the image win dow based on the location and the orientation of the plurality of edges.

27. The system as recited in claim 19, wherein the second feature is the color content of each one of the video frames and wherein the view boundary detector is configured to detect the color content of each video frame.

28. The system as recited in claim 27, wherein the view boundary detector is configured to detect the occurrence of a change in the color content between adjacent video frames.

29. The system as recited in claim 19, wherein the summary generator is configured to generate a sequence of individual video frames selected by the key frame selector.

30. The system as recited in claim 29, wherein the summary generator is configured to provide an association between each individual video frame of the summary and the corresponding sequence of consecutive video frames that includes the individual video frame.

31. The system as recited in claim 19, wherein the summary generator is configured to generate a subset of the first sequence of consecutive video frames bounded by a first occurrence of the first feature selected by the key frame selector and a second occurrence of the first feature selected by the key frame selector; generate a subset of the second sequence of consecutive video frames bounded by a first occurrence of the first feature and a second occurrence of the first feature selected by the key frame selector; and generate a sequence of the subset of the first sequence of consecutive video frames and the subset of the second sequence of consecutive video frames.

32. The system as recited in claim 31, wherein the summary generator is configured to provide an association between the first and second subset and the corresponding sequences of consecutive video frames that include the first and second subsets, respectively.

* * * * *

UNITED STATES PATENT AND TRADEMARK OFFICE
CERTIFICATE OF CORRECTION

PATENT NO. : 6,514,207 B2
DATED : February 4, 2004
INVENTOR(S) : Ebadollahi et al.

It is certified that error appears in the above-identified patent and that said Letters Patent is hereby corrected as shown below:

Column 1,
Line 12, should have the following paragraph added
-- STATEMENT OF GOVERNMENT RIGHT The present invention was made in part with support from United States National Science Foundation (NSF), grant no. IIS-9817434. Accordingly, the United States Government may have certain rights in this invention. --

Column 17,
Line 4, "win dow" should read -- window --

Signed and Sealed this

Fifth Day of April, 2005

JON W. DUDAS
*Director of the United States Patent and Trademark Office*